US009507381B1

(12) United States Patent
Vanderet et al.

(10) Patent No.: US 9,507,381 B1
(45) Date of Patent: Nov. 29, 2016

(54) METHOD AND DEVICE FOR ATTACHING STYLUS TO COMPUTING DEVICE

(71) Applicant: Amazon Technologies, Inc., Reno, NV (US)

(72) Inventors: Timothy Michael Vanderet, San Francisco, CA (US); Joshua Danel Lemons, San Jose, CA (US); Miguel Angel Morales, Mountain View, CA (US); Josue Jean Rodriquez, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 224 days.

(21) Appl. No.: 14/445,687

(22) Filed: Jul. 29, 2014

(51) Int. Cl.
| | |
|---|---|
| *A47B 96/06* | (2006.01) |
| *H05K 7/00* | (2006.01) |
| *G06F 1/16* | (2006.01) |
| *G06F 3/0354* | (2013.01) |

(52) U.S. Cl.
CPC ........... *G06F 1/1656* (2013.01); *G06F 1/1684* (2013.01); *G06F 3/03545* (2013.01)

(58) Field of Classification Search
CPC ..................................................... G06F 1/1632
USPC ....................................... 361/679.01–679.27
See application file for complete search history.

(56) References Cited

U.S. PATENT DOCUMENTS

| | | | |
|---|---|---|---|
| 2010/0238620 A1* | 9/2010 | Fish ...................... | G06F 1/1616 361/679.09 |
| 2013/0301200 A1* | 11/2013 | Leung .................. | G06F 1/1607 361/679.4 |
| 2013/0335903 A1* | 12/2013 | Raken .................. | G06F 1/1613 361/679.4 |

* cited by examiner

*Primary Examiner* — Jerry Wu
(74) *Attorney, Agent, or Firm* — Seyfarth Shaw LLP; Ilan N. Barzilay; Joseph M. Walker

(57) ABSTRACT

A system for magnetically coupling a stylus device to a computing device is disclosed. The computing device may include a first pair of magnets disposed in or on the computing device, wherein the first pair of magnets include two magnets proximate to each other and of opposite magnetic polarity. The stylus device may include a second pair of magnets disposed in or on the stylus device, wherein the second pair of magnets include two magnets proximate to each other and of opposite magnetic polarity. The first and second pairs of magnets are oriented to align opposite poles of the magnets to couple the stylus device to the computing device, and the magnetic interactions resist rotational and shear forces, and resist the stylus device being placed in an incorrect position on the computing device.

17 Claims, 13 Drawing Sheets

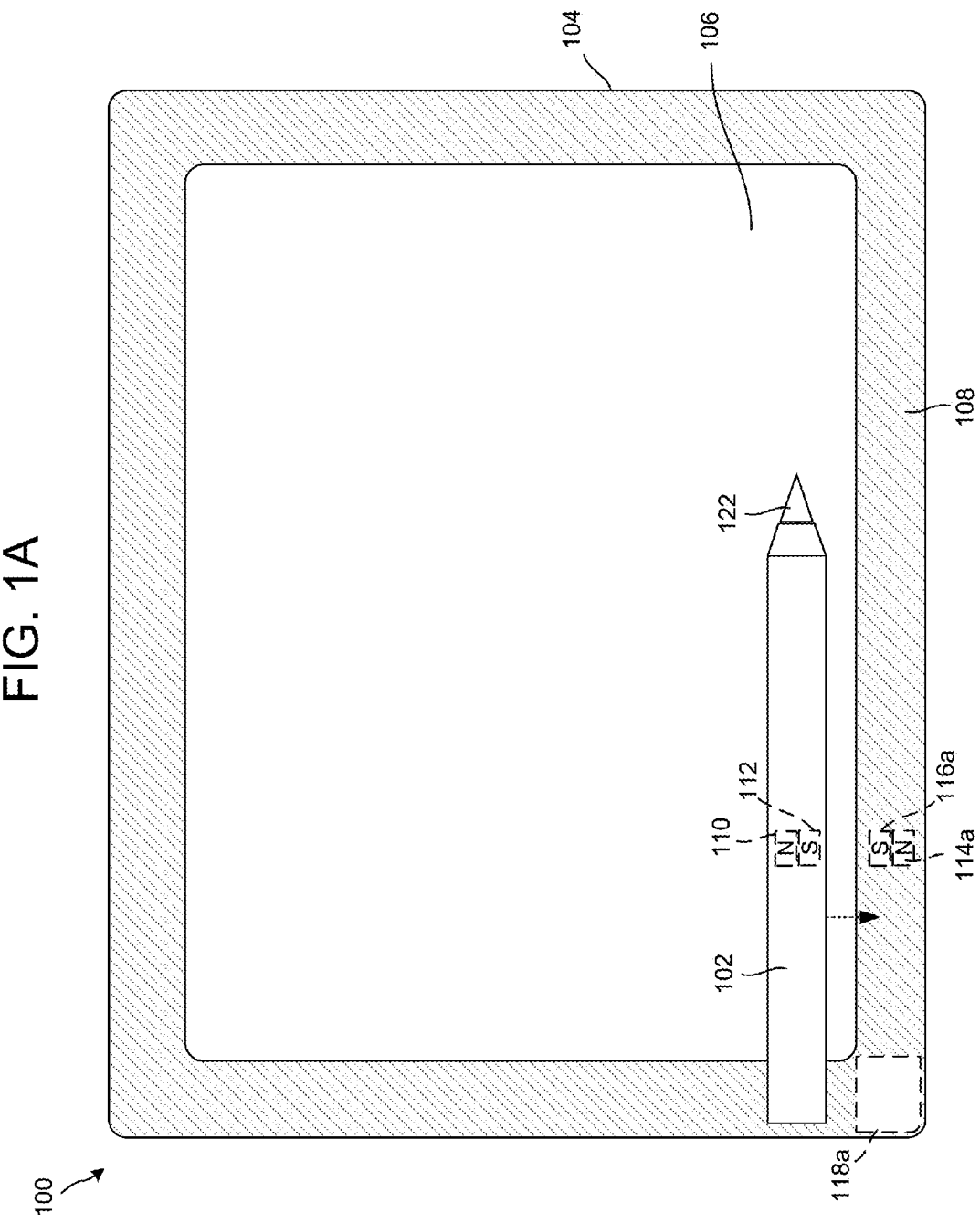

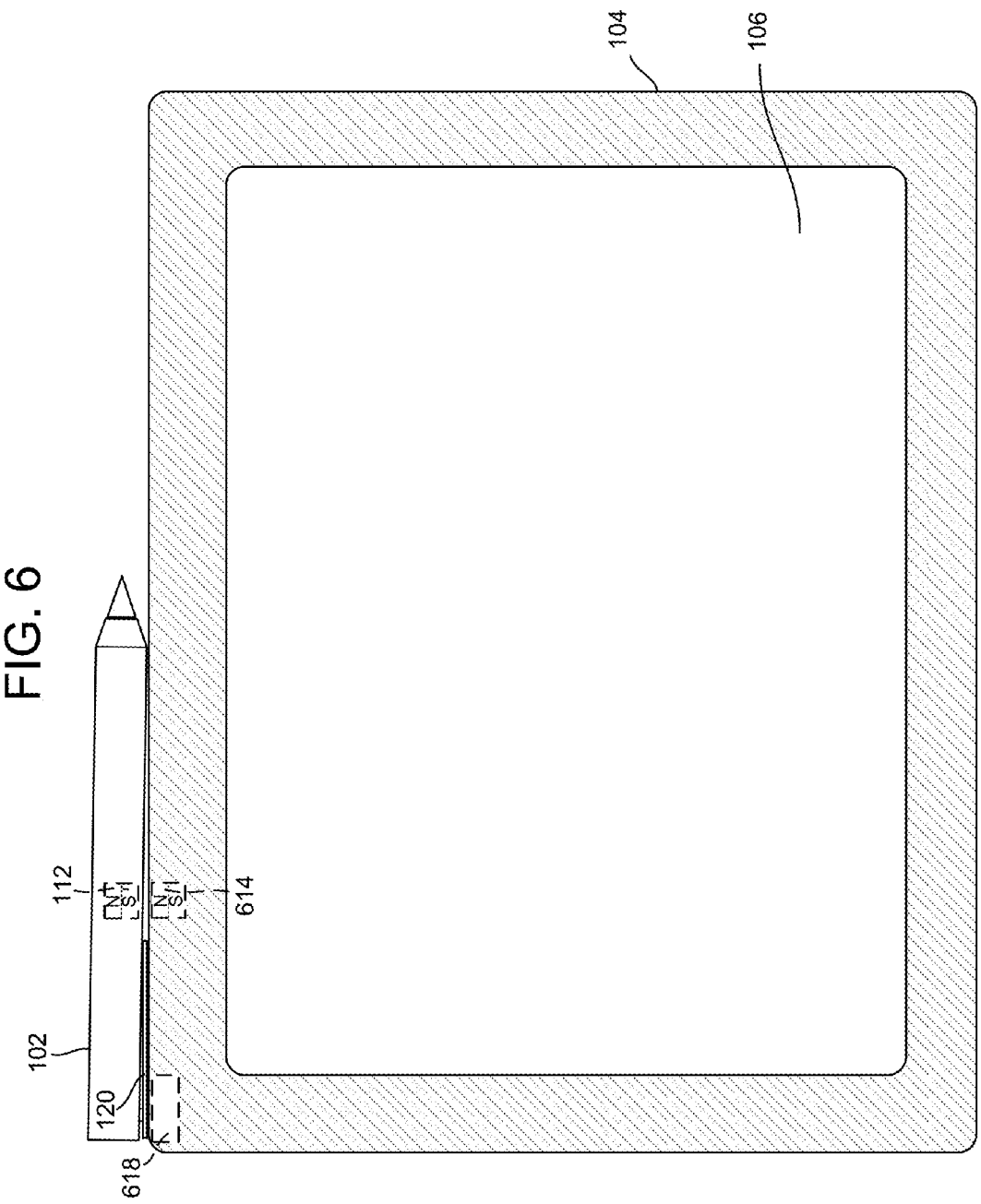

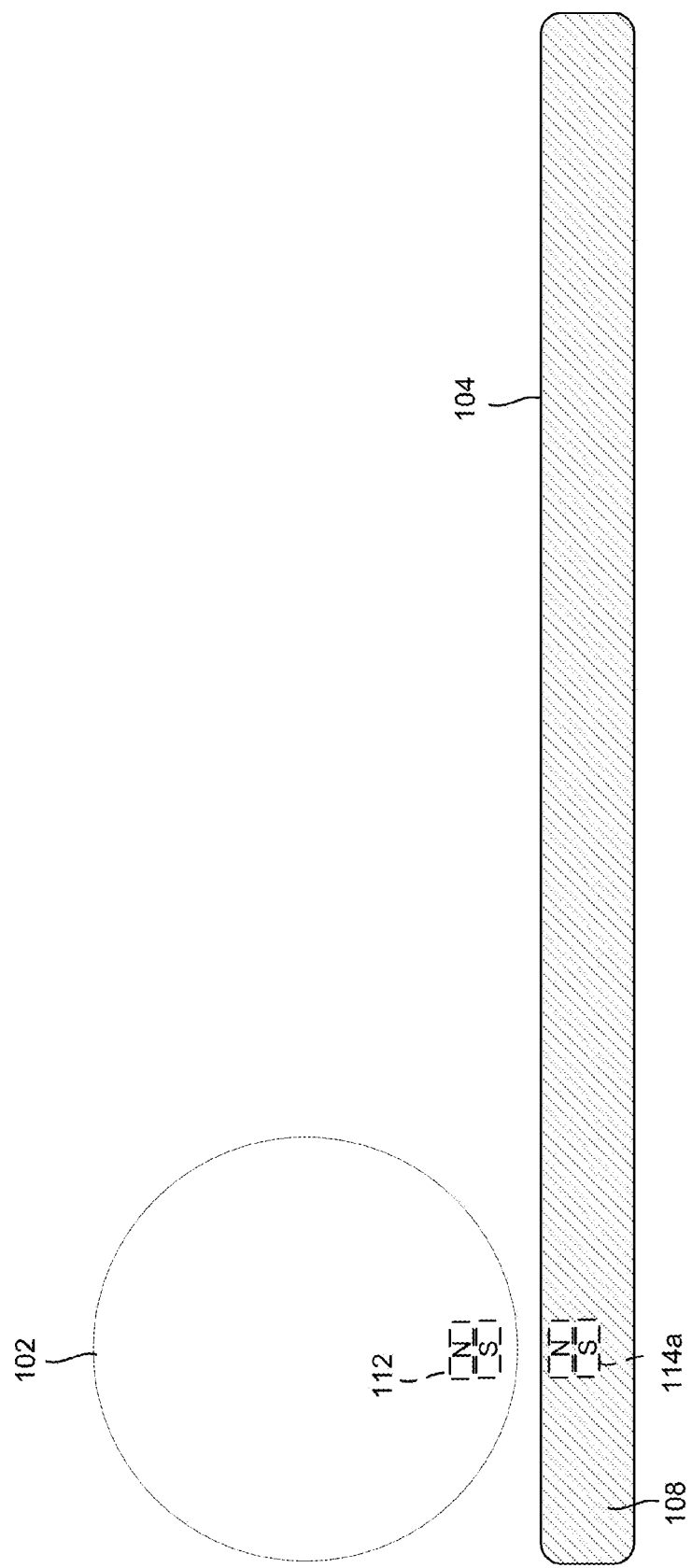

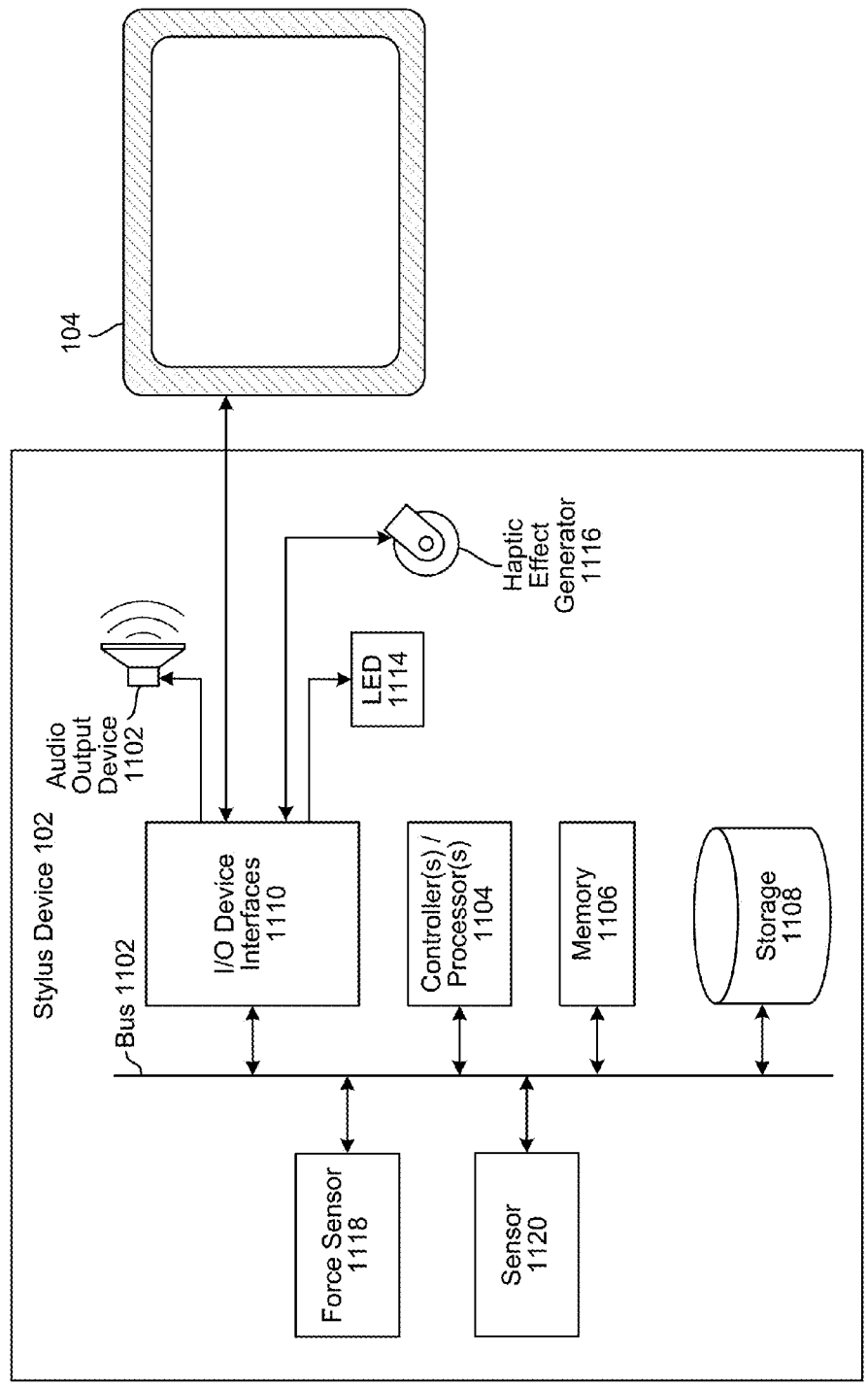

METHOD AND DEVICE FOR ATTACHING STYLUS TO COMPUTING DEVICE

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings. The drawings illustrate various embodiments and are not to scale.

FIGS. 1A-1B illustrate an overview of a system for implementing embodiments of the present disclosure.

FIG. 6 illustrates another exemplary view of a computing device and stylus device according to embodiments of the present disclosure.

FIGS. 7A-7B illustrate an overview of a system for implementing embodiments of the present disclosure.

FIG. 11 is a block diagram conceptually illustrating example components of a stylus device according to embodiments of the present disclosure.

DETAILED DESCRIPTION

Figure 1B:
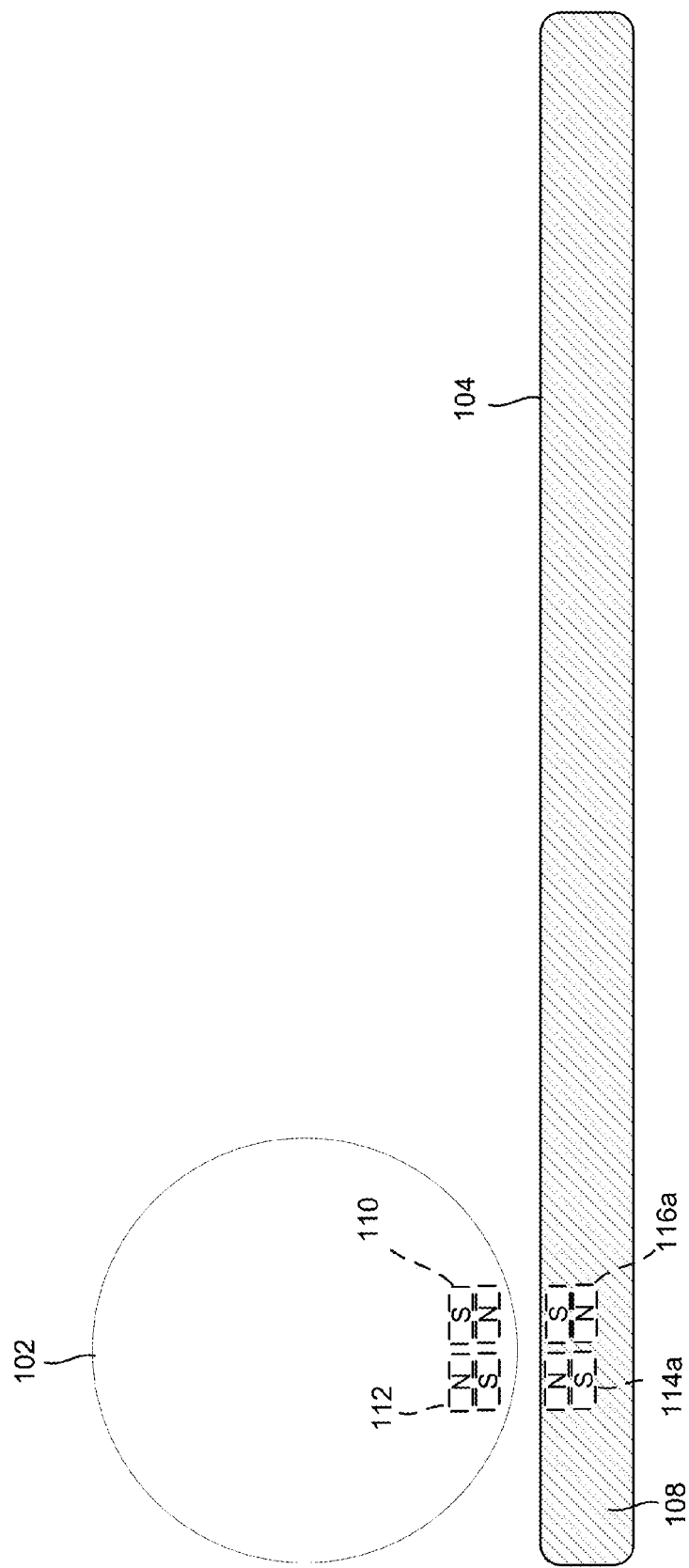

A stylus device is generally used to write, draw, send messages, navigate through menus and interfaces, and to perform other functions and operations on a computing device. When the stylus device is being used, it is typically held by a user, for example, in the user's hand. However, when the stylus device is not being used, it may be coupled to the computing device to prevent the stylus device from being lost, falling off the computing device, or otherwise moving.

In an embodiment, the stylus device may be coupled to the computing device using one or more paired magnets. For example, the stylus device may include a first pair of permanent magnets that are proximate to each other and have respective opposite magnetic poles (e.g., a magnetic north pole (N) and a magnetic south pole (S)) facing in a same direction. A "permanent magnet" is an object made from a material that is magnetized and creates its own persistent magnetic field, as compared to an electromagnet that has no persistent field and becomes magnetized only when a charge is applied to it.

Similarly, the computing device may include a corresponding second pair of permanent magnets that are proximate to each other and have respective opposite magnetic poles facing in a same direction. While the magnets are described as being pairs of magnets, each pair of magnets may be a single magnet including the magnetic north pole and magnetic south pole arranged as described herein.

The first and second pairs of magnets may be oriented to allow a magnetic south pole of the first pair of magnets of the stylus device to align with a magnetic north pole of the second pair of magnets of the computing device, and a magnetic north pole of the first pair of magnets of stylus device to align with a magnetic south pole of the second pair of magnets of the computing device when the stylus device is placed on or near an edge portion of the computing device. The magnetic forces produced by the first and second pairs of magnets (e.g., the magnetic attraction forces of opposite poles and the magnetic resistive forces of similar poles) serve to pull and/or push the stylus device into the correct position on the computing device. The magnet forces also serve to resist shear forces applied to the stylus device to push it off of the computing device, and resist the stylus device being placed in an incorrect position on the computing device.

FIG. 1A illustrates an overview of a system 100 for implementing embodiments of the disclosure. The system includes a stylus device 102 and a computing device 104 having a screen 106. The stylus device 102 may be positioned along an outer peripheral edge portion 108 of the computing device 104, as illustrated by the arrow in FIG. 1A. The stylus device 102 may include a first pair of magnets including two magnets disposed in or on the stylus device 102, such as in or on a body of the stylus device 102. For example, the stylus device 102 may include a first magnet 110 having a magnetic north pole (N) oriented to face in a first direction and a second magnet 112 having a magnetic south pole (S) oriented to face in the same first direction. Similarly, the computing device 104 may include a second pair of magnets including a first magnet 114a having a magnetic north pole (N) oriented to face in a second direction and a second magnet having a magnetic south pole (S) oriented to face in the same second direction.

FIG. 1B. illustrates a cross section of a portion of the stylus device 102 and computing device 104 of FIG. 1A when the stylus device 102 is aligned with the computing device 104. As can be seen in FIGS. 1A and 1B, the N of the first magnet 114a of the computing device 102 may be positioned to align with the S of the second magnet 112 of the stylus device 102, and the S of the second magnet 116a of the computing device 102 may be positioned to align with the N of the first magnet 110 of the stylus device 102. This allows the N of the first magnet 110 to align with the S of the second magnet 116a in the computing device 104 and the S of the second magnet 112 to align with the N of the first magnet 114a in the computing device 104 to magnetically couple the stylus device 102 to the computing device 104, for example, within a boundary of the computing device 104. When the magnets are aligned they may be oriented to attract each other as the stylus device 102 approaches the computing device 104. When the magnets attract each other and couple, they will act to hold the stylus device 102 to the computing device 104. The magnets may couple even if they are not in physical contact with each, for example, the first magnet 114a may couple to the second magnet 112 even though the only physical contact is between the outer portion of the computing device 102 to the outer portion of the stylus device 102.

As can be seen in FIGS. 1A and 1B, the magnets are configured to align when the tip of the stylus device 102 is distal (i.e., away) from the corner of the computing device 104 and the other end of the stylus device 102 is proximate (i.e., near) the corner of the computing device. The corner of the computing device 104 is generally located at the intersection between the horizontal and vertical edges of the device. When magnets are illustrated as proximate to the corner, the magnets may be placed within a distance of the corner so that the stylus device 102 may be coupled to the computing device 104 in a manner so that no portion of the stylus device 102 (such as the non-tip end of the stylus device 102) protrudes from the edge of the computing device 104, thus reducing the likelihood that the stylus device 102 may be accidentally dislodged from the computing device 104.

The computing device 104 may also include a magnet 118a disposed in or on the outer peripheral edge portion 108 proximate to a corner of the computing device 104. Additionally, the stylus device 102 may include another magnetic portion, such as a ferromagnetic clip (such as clip 120 illustrated in FIG. 3). The ferromagnetic clip may be magnetically attracted to the magnet 118a of the computing device 104 to further couple the stylus device 102 to the computing device 104. The addition of the magnetic clip on the stylus device 102 and magnet 118a on the computing device serves to provide additional stability as described below. The respective magnets of the stylus device 102 and computing device 104 may be configured such that the magnetic forces between aligned magnets couple the stylus device 102 to the computing device 104 to avoid undesired separation of the two but still allow easy removal of stylus device 102 from the computing device 104 by a user. Various configurations of the magnetics and their respective forces when coupled to other magnets are possible. In one embodiment, a magnetic force between the ferromagnetic clip 120 and magnet 118a is less than the magnetic force between the first magnet 114a and the second magnet 122. This embodiment configures the stylus device 102 to be decoupled from the computing device 104 by first removing the non-tip end of the stylus device 102 and then removing the tip end.

Figure 2:
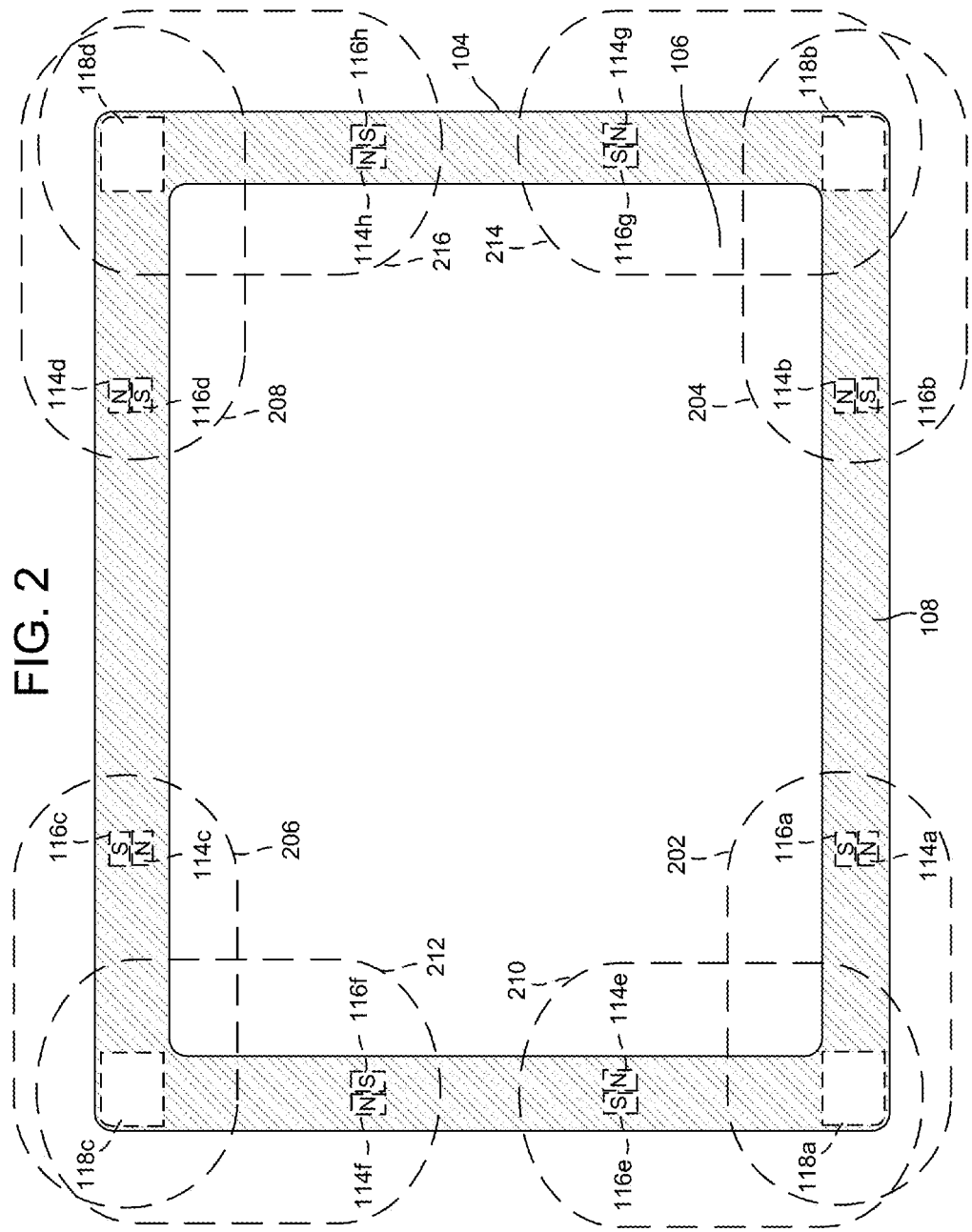
FIG. 2 illustrates an exemplary computing device according to embodiments of the present disclosure.

Referring to FIG. 2, the computing device 104 may include one or more sets of magnets for use in coupling the stylus device 102 to one or more portions of the computing device 104. For example, the computing device 104 includes a first set of magnets 202 including the first magnet 114a having the N, the second magnet 116a having the S, and the magnet 118a. As described above, the N of the first magnet 114a is positioned to align with the S of the second magnet 112 of the stylus device 102, the S of the second magnet 116a is positioned to align with the N of the first magnet 110 of the stylus device 102, and the magnet 118a is positioned proximate to a left corner of the computing device 104 to align with the ferromagnetic clip (such as ferromagnetic clip 120 illustrated in FIG. 3) of the stylus device. This allows the stylus device 102 to be coupled to the computing device 104.

In one embodiment, the first magnet 114a and the second magnet 116a may be spaced a distance of about 45 millimeters to about 60 millimeters from the magnet 118a. The first magnet 114a and the second magnet 116a may be about 5 millimeters to about 10 millimeters in length, and the magnet 118a may be about 5 millimeters to about 8 millimeters in length. The precise dimensions and locations of the magnets on the computing device 104 and stylus device 102 are configurable, though the distance between the pair of magnets 114a/116a and magnet 118a should be such that the pair of magnets of the computing device 104 can align with the pair of magnets of the stylus device 102 while the magnet 118a aligns with the clip of the stylus device 102.

As shown in FIG. 2, the computing device 104 may additionally or alternatively include multiple sets of magnets. For example, the computing device may include a second set of magnets 204 including a first magnet 114b, a second magnet 116b, and the magnet 118b disposed proximate to a right corner of the computing device 104. This second set may allow the stylus device 102 to be coupled to the computing device 104 with the ferromagnetic clip (such as ferromagnetic clip 120 illustrated in FIG. 3) aligning with magnet 118b, and the N of the first magnet 110 and the S of the second magnet 112 aligning with the S of the second magnet 116b and the N of the first magnet 114b in a similar manner as described above, although at a different position on the computing device.

In further exemplary embodiments, the computing device may include a third set of magnets 206 including a first magnet 114c, the second magnet 116c, and a magnet 118c disposed proximate to an upper left corner of the computing device 104. Similarly, the computing device may include a fourth set of magnets 208 including first and second magnets 114d and 116d, and a magnet 118d; a fifth set of magnets 210 including first and second magnets 114e and 116e, and the magnet 118a; a sixth set of magnets 212 including first and second magnets 114f and 116f, and the magnet 118c; a seventh set of magnets 214 including first and second magnets 114g and 116g, and the magnet 118b; and an eighth set of magnets 216 including first and second magnets 114h and 116h, and the magnet 118d, all oriented and arranged as illustrated in FIG. 2. As discussed above, the spacing between the magnets may be such that the pairs of the computing device align with the pairs of the stylus while the single magnet 118 aligns with the stylus clip.

These sets of magnets, one or more of which may be included in the computing device 104, allow for the stylus device 102 to be coupled to the computing device 104 at varying locations in varying orientations. This may provide the user with options, and allow the user to place the stylus device 102 in a location comfortable and/or convenient to the user. It should be appreciated that the magnets may be placed in any location on the computing device 104, so long as the magnets properly align with the magnets of the stylus device 102. For example, the magnets may also be placed in or on a back portion, a top edge, a bottom edge, and/or a side edge of the computing device 104.

Figure 3:
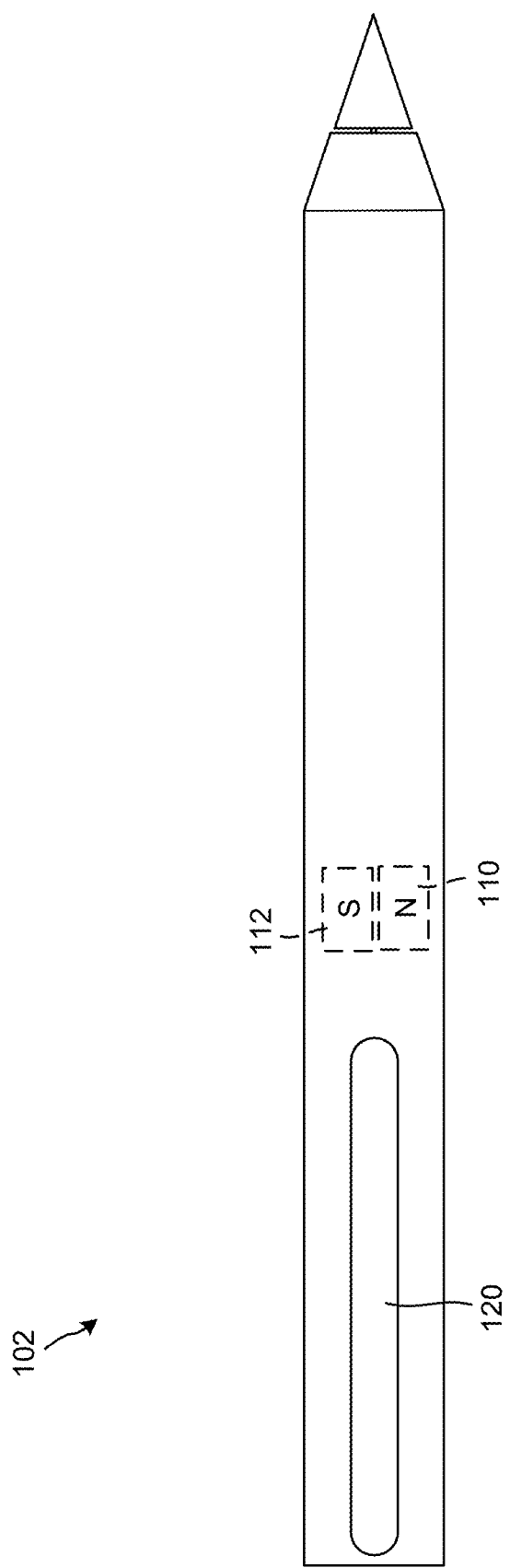
FIG. 3 illustrates an exemplary stylus device according to embodiments of the present disclosure.
Figure 4:
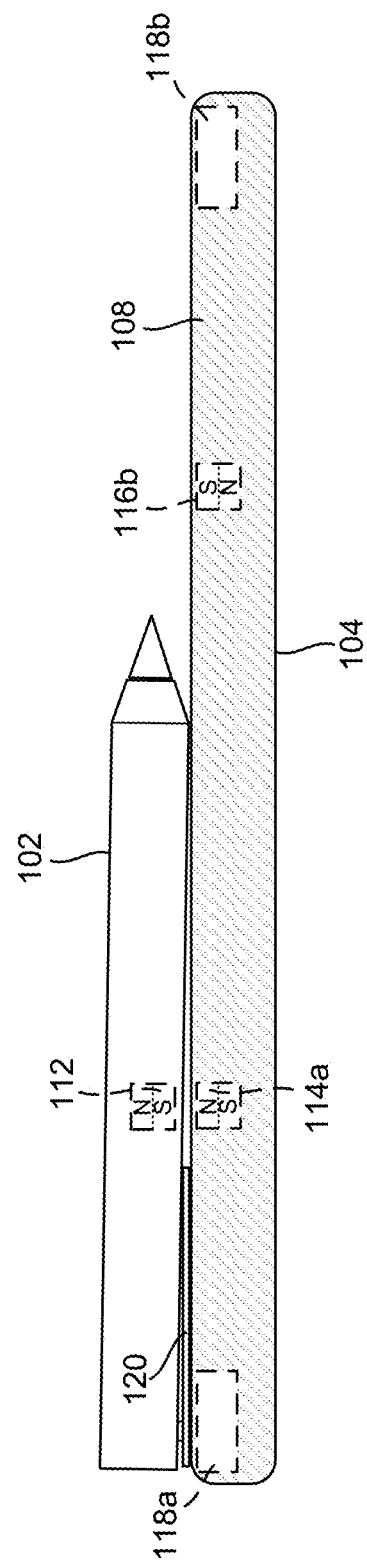
FIG. 4 illustrates an exemplary side view of a computing device and stylus device according to embodiments of the present disclosure.

Referring to FIGS. 3 and 4, the ferromagnetic clip 120 of the stylus device 102 may be for example, a clip that allows a user to couple the stylus device 102 to a shirt or pant pocket. The first and second magnets 110 and 112 and/or the ferromagnetic clip 120 may be positioned to allow the ferromagnetic clip 120 to face the computing device 104 when the stylus device 102 is magnetically coupled to the computing device 104.

The ferromagnetic clip 120 may be a stainless steel alloy that is magnetically permeable to allow the ferromagnetic clip 120 to interface with one or more of the magnets 118a-118d illustrated in FIG. 2. The first and second magnets 110 and 112 may be disposed in the stylus device 102 and located substantially in a central portion along a length of the stylus device 102. In an embodiment, the first and second magnets 110 and 112 may be located a distance of about 50 millimeters to about 70 millimeters from an end of the stylus device 102.

Figure 5:
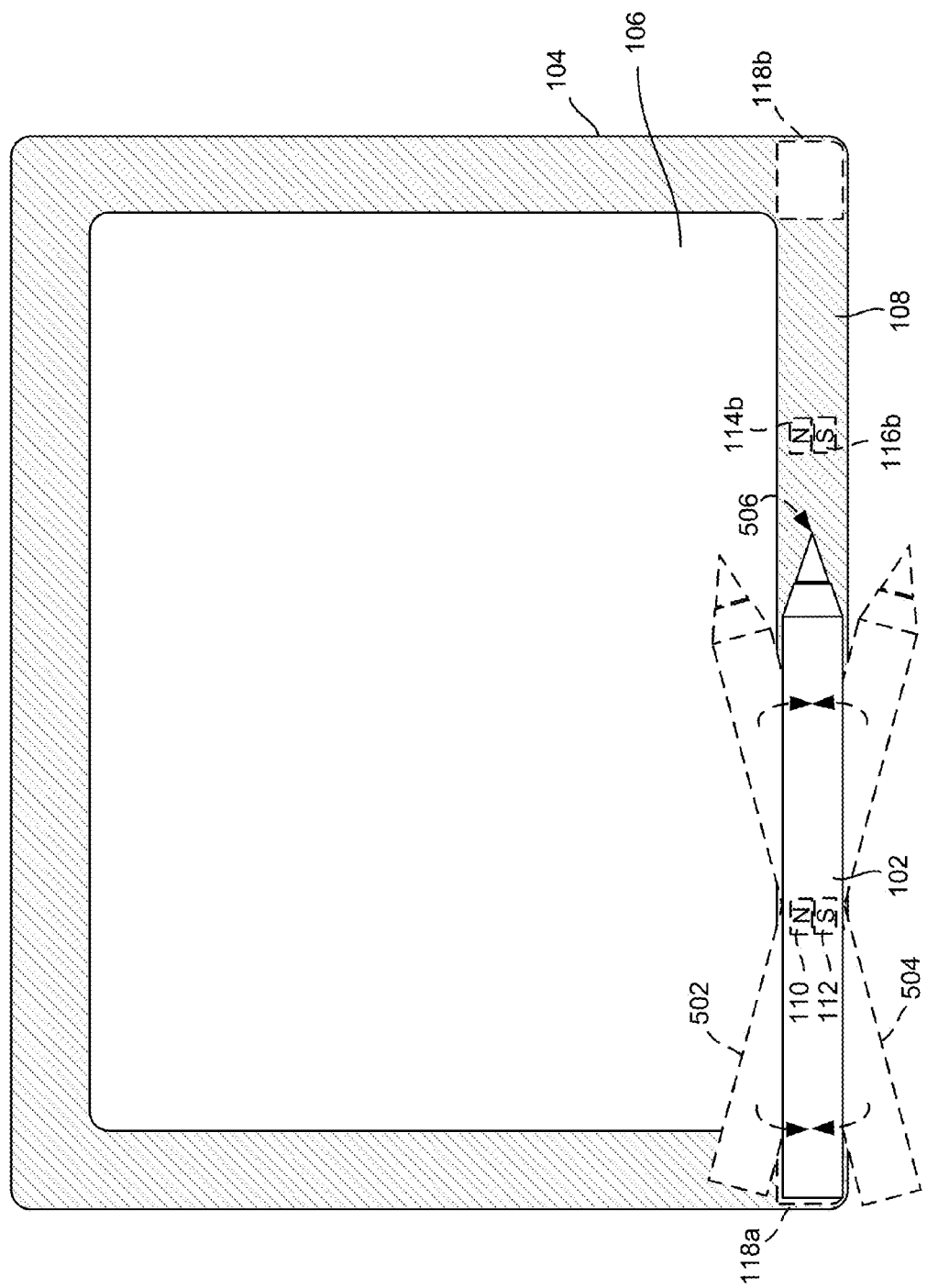
FIG. 5 illustrates an exemplary interaction between a computing device and stylus device according to embodiments of the present disclosure.

Referring to FIGS. 2 and 5, the pair of magnets (i.e., the first and second magnets 110 and 112) of the stylus device 102 and a pair of magnets (e.g., the first and second magnets 114a and 116a) of the computing device 104, as well as the ferromagnetic clip 120 and the magnet (118a-d) of the computing device 104 serve to pull and/or push the stylus device 102 into the correct position on the computing device 104, resist shear forces applied to the stylus device 102 to push it off of the computing device 104, and resist the stylus device 102 being placed in an incorrect position on the computing device 104.

For example, when the stylus device 102 is in positions 502/504, the interactions between the magnetic fields of the first and second magnets 110 and 112 of the stylus device 102 and the first and second magnets 114a and 116a of the computing device 104 may cause the stylus device 102 to orient itself in order to align the first magnet 110 of the stylus device 102 with the second magnet 116a of the computing device 104, and the second magnet 112 of the stylus device 102 with the first magnet 114a of the computing device 104 (i.e., to orient the stylus as shown in position 506). This is caused by the attraction forces of the N of the first magnet 110 of the stylus device 102 to the S of the second magnet 116a of the computing device 104 and the S of the second magnet 112 of the stylus device 102 to the N of the first magnet 114a of the computing device 104; and the repelling forces of the N of the first magnet 110 of the stylus device 102 to the N of the first magnet 114a of the computing device 104 and the S of the second magnet 112 of the stylus device 102 to the S of the second magnet 116a of the computing device 104.

The interactions of the magnetic fields also resist rotational forces and shear forces applied to the stylus device 102, such as, shear forces applied in a direction parallel to the screen 106 of the computing device 104 to push the stylus device 102. For example, when the stylus device 102 is coupled to and properly oriented on the computing device 104, a force applied to move the stylus device 102 in a direction parallel to the screen 106 of the computing device 104 is resisted. The attraction forces between the N of the first magnet 110 of the stylus device 102 and S of the second magnet 116a of the computing device 104, and the S of the second magnet 112 of the stylus device 102 and the N of the first magnet 114a of the computing device 104 tend to counteract shear force. Additionally, the repelling forces of the N of the first magnet 110 of the stylus device 102 and the N of the first magnet 114a of the computing device 104, and the S of the second magnet 112 of the stylus device 102 and the S of the second magnet 116a of the computing device 104 counteract shear force.

In an embodiment, the attraction forces between the first magnet 110 of the stylus device 102 and the second magnet 116a-h of the computing device 104, and the second magnet 112 of the stylus device 102 and the first magnet 114a-h of the computing device 104 are greater than the attraction forces between the ferromagnetic clip 120 and the magnet 118a-d of the computing device. From a user's perspective this may be desirable, for example, when the user removes the stylus device 102 from the computing device 104 a top end of the stylus device 102 may be easier to remove. This may provide a type of guiding of the stylus device 102 into a position of use.

As described above, the magnets of the computing device 104 may be placed in any location on the computing device 104, so long as the magnets are oriented to properly align with the magnets of the stylus device 102, as described above. As an example, referring to FIG. 6, the magnets of the computing device may be positioned to couple the stylus device 102 to a peripheral edge of the computing device 104 outside the boundary of the computing device 104. As illustrated in FIG. 6, a magnet 618 is disposed proximal to a corner of the computing device 104, and a pair of opposite polarity magnets, one of which is visible and illustrated as 614, may be positioned to align the poles with the first and second 110 and 112 magnets of the stylus device 102 (for example, the N of the magnet 614 may be positioned to align with the S of the second magnet 112).

Figure 7A:
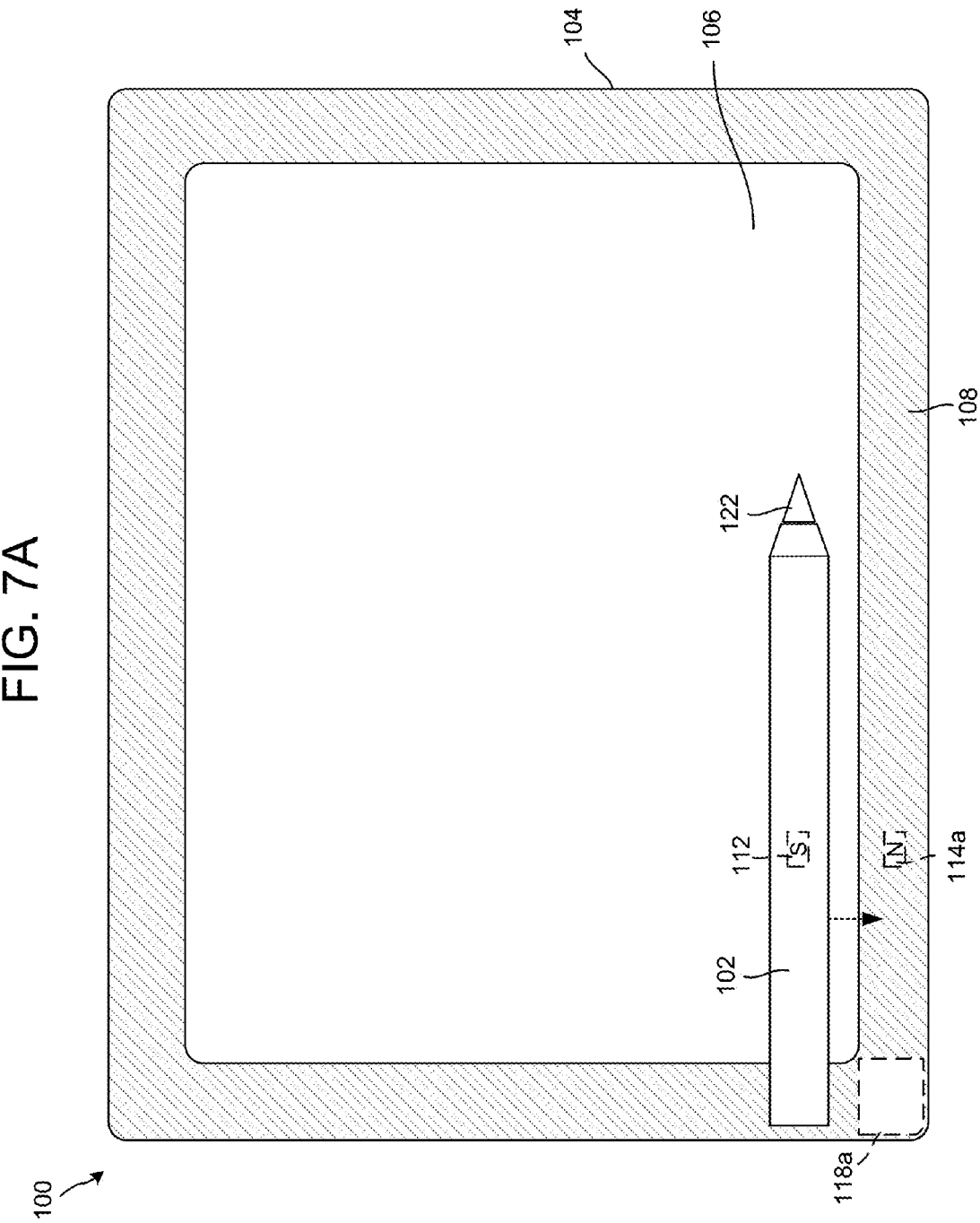

In an aspect, referring to FIG. 7A the stylus device 102 may include a single magnet (for example, the first magnet 110 or the second magnet 112 described above) disposed in or on the stylus device 102. For purposes of illustration, the stylus device 102 may include the second magnet 112. Similarly, the computing device 104 may include a corresponding magnet (for example, the first magnet 114a or the second magnet 116a described above) disposed in or on the outer peripheral edge portion 108, such as in or on an outer casing of the computing device 104. For purposes of illustration, the computing device 104 may include the first magnet 114a having the N oriented to align with the S of the second magnet 112. FIG. 7B. illustrates a cross section of a portion of the stylus device 102 and computing device 104 of FIG. 7A when the stylus device 102 is aligned with the computing device 104.

The N of the first magnet 114a of the computing device 102 and the S of the second magnet 112 of the stylus device 102 may be positioned to align with one another to magnetically couple the stylus device 102 to the computing device 104, for example, within a boundary of the computing device 104, in a similar manner as described above. The computing device 104 may also include the magnet 118a and the stylus device 102 may include the clip 120 (as illustrated in FIGS. 3, 4, and 6) to provide additional stability as described herein. The precise dimensions and locations of the magnets on the computing device 104 and stylus device 102 are configurable, though the distance between magnet 114a and magnet 118a should be such that the magnet 114a of the computing device 104 can align with the magnet 112 of the stylus device 102 while the magnet 118a of the computing device 104 aligns with the clip of the stylus device 102. Similar spacing constraints may be applied to the sets of magnets discussed below in reference to FIG. 8.

Figure 8:
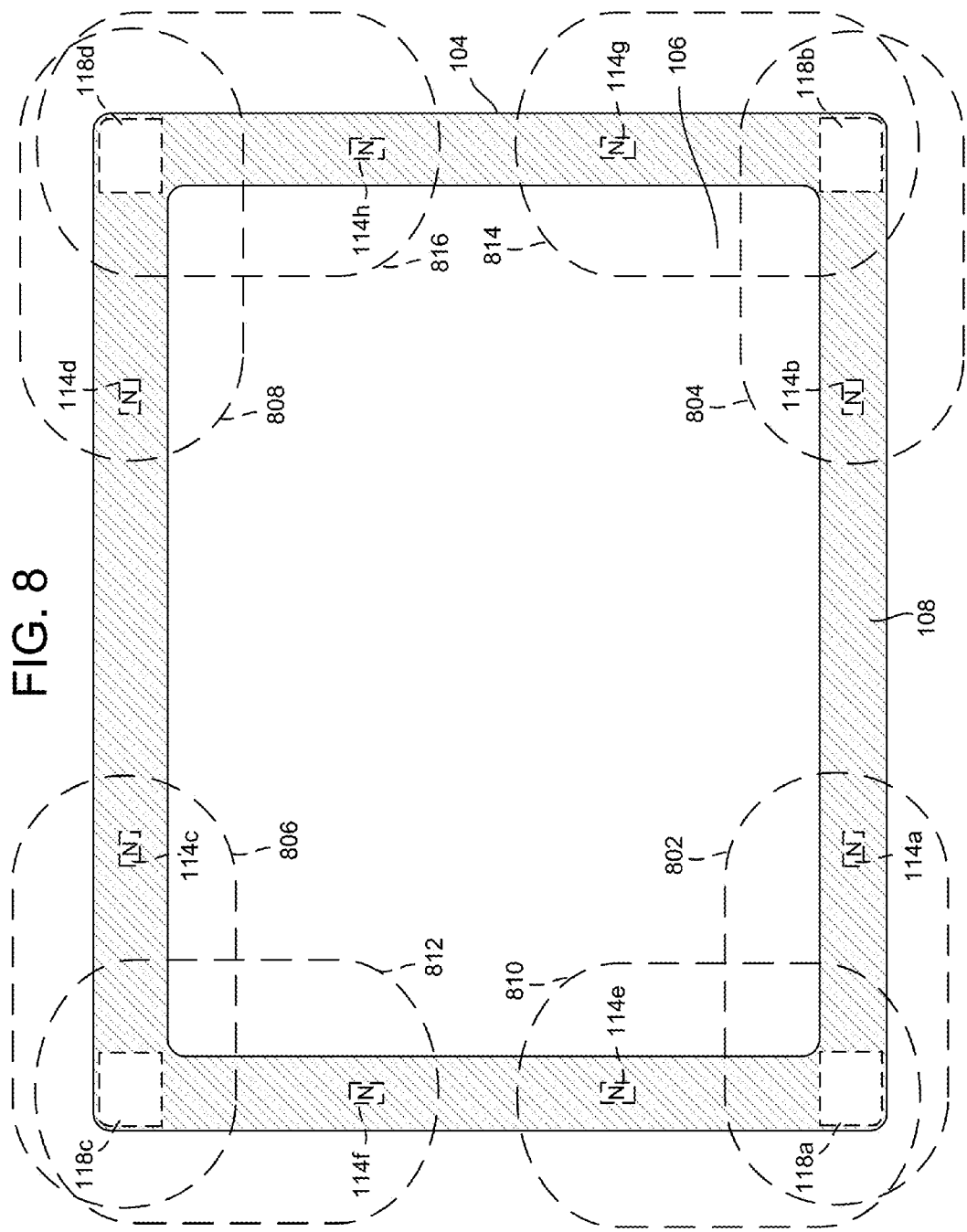
FIG. 8 illustrates an exemplary computing device according to embodiments of the present disclosure.

Referring to FIG. 8, the computing device 104 may include multiple sets of magnets for use in coupling the stylus device 102 to one or more portions of the computing device 104. For example, the computing device 104 may include a first set of magnets 802 including the first magnet 114a and the magnet 118a. The computing device 104 may additionally or alternatively include a second set of magnets 804 including the first magnet 114b and the magnet 118b; a third set of magnets 806 including the first magnet 114c and the magnet 118c; a fourth set of magnets 808 including the first magnet 114d and the magnet 118d; a fifth set of magnets 810 including the first magnet 114e and the magnet 118a; a sixth set of magnets 812 including the first magnet 114f and the magnet 118c; a seventh set of magnets 814 including the first magnet 114g and the magnet 118b; and an eighth set of magnets 816 including the first magnet 114h and the magnet 118d, all arranged as illustrated in FIG. 8. Although magnets 114a-114h are illustrated as magnets oriented with N toward the front face of the computing device 104, they may be configured with S toward the front face of the computing device 104 to align with a stylus configured with a N magnet facing the edge of the stylus. The computing device 104 may also be configured with different combinations of N or S facing magnets to couple to different types of stylus devices. The computing device 104 may also be configured with alternating sets of magnets (for example including some sets according to FIG. 8 and some sets according to FIG. 2). As can be appreciated, various combinations of magnets, alignments, and orientations are possible for the stylus device 102 and computing device 104 according to the present disclosure.

As described above, these sets of magnets, one or more of which may be included in the computing device 104, allow for the stylus device 102 to be coupled to the computing device 104 at varying locations in varying orientations. This may provide the user with options, and allow the user to place the stylus device 102 in a location comfortable and/or convenient to the user. It should be appreciated that the magnets may be placed in any location on the computing device 104, so long as the magnets properly align with the magnet(s) of the stylus device 102. For example, the magnets may also be placed in or on a back portion, a top edge, a bottom edge, and/or a side edge of the computing device 104, for example as illustrated in FIG. 6.

Figure 9:
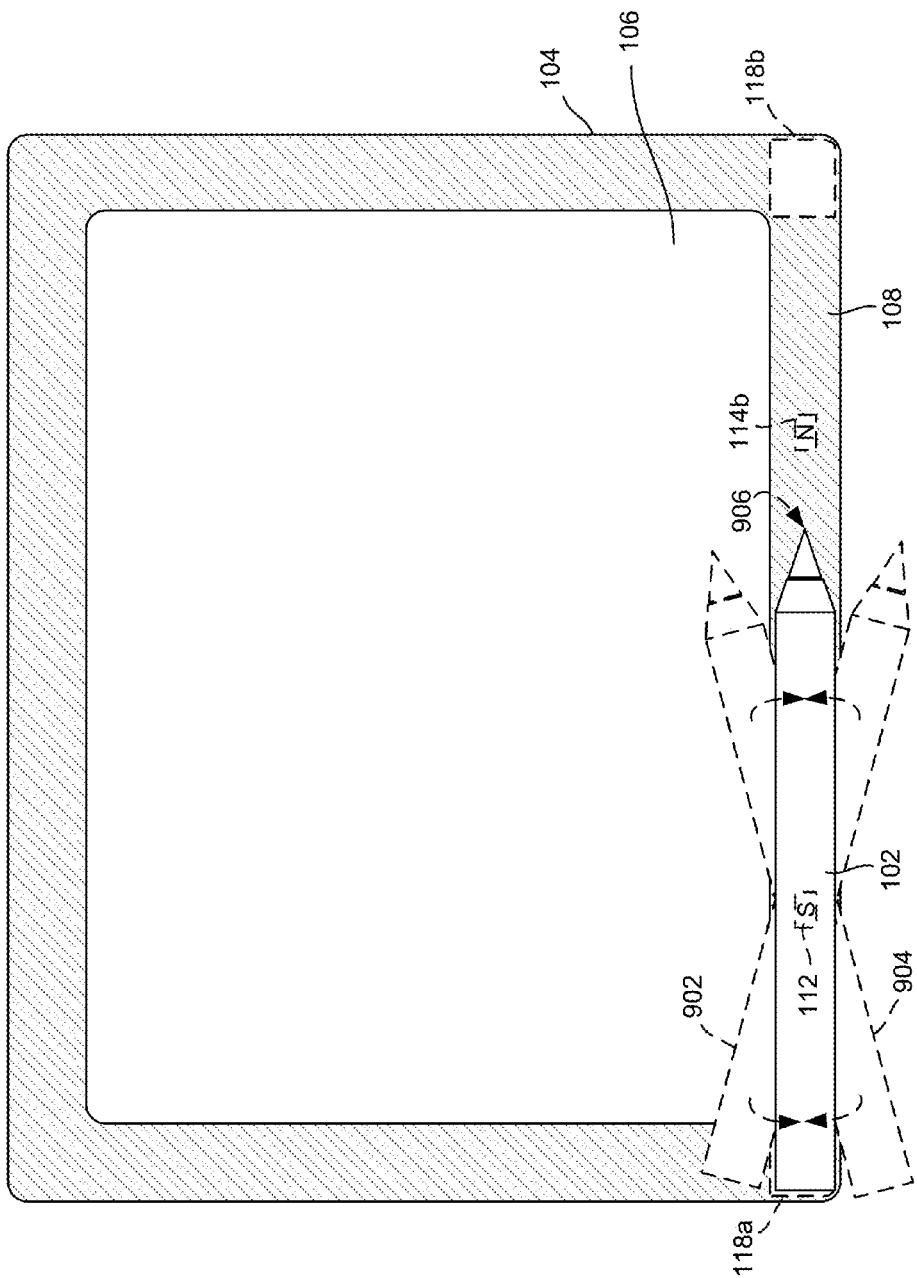
FIG. 9 illustrates an exemplary interaction between a computing device and stylus device according to embodiments of the present disclosure.

Referring to FIGS. 8 and 9, the magnet(s) (i.e., the first magnet 110 or the second magnet 112) of the stylus device 102 and the magnet(s) (e.g., the first or second magnets 114*a* or 116*a*) of the computing device 104, as well as the ferromagnetic clip 120 and the magnet (118*a-d*) of the computing device 104 serve to pull and/or push the stylus device 102 into the correct position on the computing device 104, resist shear forces applied to the stylus device 102 to push it off of the computing device 104, and resist the stylus device 102 being placed in an incorrect position on the computing device 104. The interactions of the magnetic fields also resist rotational forces and shear forces applied to the stylus device 102, such as, shear forces applied in a direction parallel to the screen 106 of the computing device 104 to push the stylus device 102.

For example, when the stylus device 102 is in positions 902/904, the interactions between the magnetic fields of the second magnet 112 of the stylus device 102 and the first magnet 114*a* of the computing device 104, as well as the interaction of the ferromagnetic clip 120 and the magnet 118*a* of the computing device 104 may cause the stylus device 102 to orient itself in order to align the S of the second magnet 112 of the stylus device 102 to the N of the first magnet 114*a* of the computing device 104 and the ferromagnetic clip 120 to the magnet 118*a* of the computing device 104. This is caused by the attraction forces of the S of the second magnet 112 of the stylus device 102 to the N of the first magnet 114*a* of the computing device 104; and the ferromagnetic clip 120 to the magnet 118*a* of the computing device 104.

Referring back to FIGS. 1 and 7, in an embodiment, the stylus device 102 may be an active capacitive type stylus or a passive type stylus. For example, when the stylus device 102 is an active capacitive type stylus, a tip 122 or other portion of the stylus device 102 may generate a first signal (such as, an electric field generated by the stylus device at an operating frequency) to communicate data or operating information to the computing device 104. The computing device 104 may also generate a second signal (such as, an electric field of the computing device) to allow the computing device 104 to determine a position of the stylus device 102. For example, electrodes of the screen 106 of the computing device 104 may be activated to generate the second signal. The tip 122 may receive and may amplify the second signal. The stylus device 102 may then transmit the amplified signal (or the first signal) to the computing device 104 to allow the computing device 104 to determine a position and movement of the stylus device 102.

The computing device 104 and the stylus device 102 may also include components that may recognize when the stylus device 102 is properly coupled to the computing device 104. In this respect, the computing device 104 may supply power to the stylus device 102 to charge the stylus device 102, either wirelessly or through physical connection. In other respects, the stylus device 102 may turn off to save power and/or transfer data between the stylus device 102 and the computing device 104 when the stylus device 102 detects that it is coupled to the computing device 104.

Figure 10:
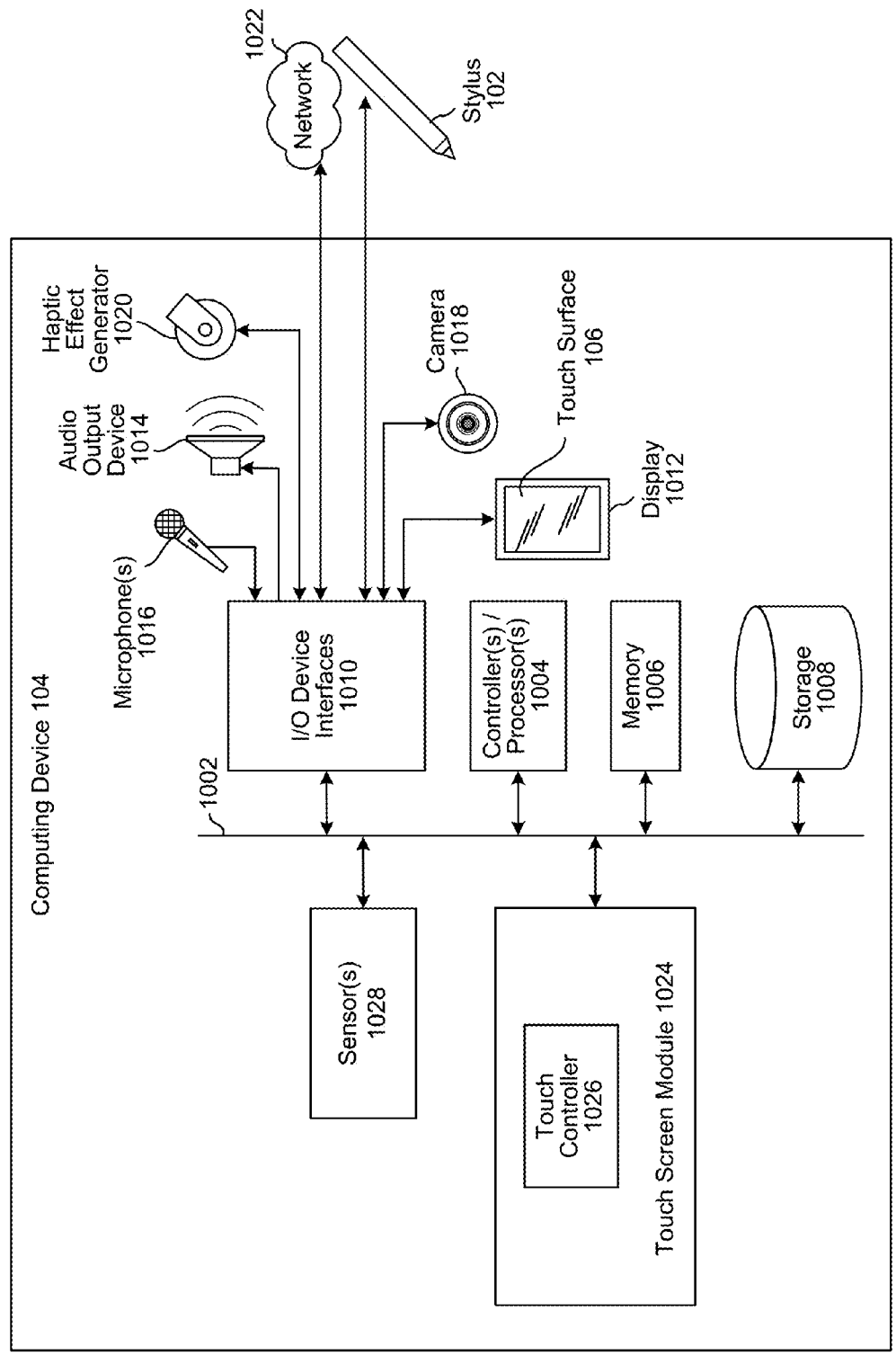
FIG. 10 is a block diagram conceptually illustrating example components of a computing device according to embodiments of the present disclosure.

FIG. 10 is a block diagram conceptually illustrating example components of the computing device 104. In operation, the computing device 104 may include computer-readable and computer-executable instructions that reside on the computing device 104, as discussed further below. The computing device 104 may include an address/data bus 1002 for conveying data among components of the computing device 104. Each component within the computing device 104 may also be directly connected to other components in addition to (or instead of) being connected to other components across the bus 1002.

The computing device 104 may include one or more microcontrollers/controllers/processors 1004 that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The computing device 104 may also include a data storage component 1008, for storing data and microcontrollers/controller/processor-executable instructions. The data storage component 1008 may include one or more non-volatile storage types such as magnetic storage, optical storage, solid-state storage, etc. The computing device 104 may also be connected to removable or external non-volatile memory and/or storage (such as a removable memory card, memory key drive, networked storage, etc.) through the input/output device interfaces 1010.

Computer instructions for operating the computing device 104 and its various components may be executed by the microcontroller(s)/controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The computing device 104 includes input/output device interfaces 1010. A variety of components may be connected through the input/output device interfaces 1010, such as a display 1012 having a touch surface or touch screen 106; an audio output device for producing sound, such as speaker(s) 1014; one or more audio capture device(s), such as a microphone or an array of microphones 1016; one or more image and/or video capture devices, such as camera(s) 1018; one or more haptic effect generators 1020; and other components. The display 1012, speaker(s) 1014, microphone(s) 1016, camera(s) 1018, haptic effect generator(s) 1020, and other components may be integrated into the computing device 104 or may be separate.

The computing device 104 may also include one or more sensor(s) 1028 that detects when the stylus device 102 is properly aligned and coupled to the computing device, as described above. In this respect, the sensor(s) 1028 may be located around the computing device 104 to coordinate with the sets of magnets. This allows the computing device 104 to know when the stylus device 102 is not being used. Based on this information, the computing device 104 may supply power to the stylus device 102 to charge the stylus device 102, may cause the stylus device to turn off to save power, and/or transfer data between the stylus device 102 and the computing device 104. One or more of the display 1012, speaker(s) 1014, microphone(s) 1016, camera(s) 1018, haptic effect generator(s) 1020 may also be adapted to output an indicator to the user that the stylus device is properly and/or improperly aligned as determined by one or more sensor(s) 1028.

The display 1012 may be a video output device for displaying images. The display 1012 may be a display of any suitable technology, such as a liquid crystal display, an organic light emitting diode display, electronic paper, an electrochromic display, a cathode ray tube display, a pico projector or other suitable component(s). The display 1012 may also be integrated into the computing device 104 or may be separate.

The input/output device interfaces 1010 may also include an interface for an external peripheral device connection such as universal serial bus (USB), FireWire, Thunderbolt or other connection protocol. The input/output device interfaces 1010 may also include a connection to one or more networks 1022 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus device 102 may connect to the computing device 104 via one of these connections. The touch surface 106 and the stylus device 102 may also communicate data or operating information to one another to enable the computing device 104 to determine a position of the stylus device 102. Additionally, in some embodiments, the computing device 104 (for example, the touch surface 106) and the stylus device 102 may communicate using electromagnetic communications (for example, electric fields generated by each device to transmit data on a carrier frequency), and/or haptic communications.

The computing device 104 further includes a touch surface or touch screen module 1024 that interacts with the stylus device 102. The touch screen module 1024 may include a touch controller 1026. The touch controller 1026 receives and tracks location and position and other information from, and may cause the transmission of information to, the stylus 102 to enable the computing device 104 to interact with the stylus 102. In an embodiment, the touch controller 1026 senses the stylus device 102 in contact with the touch screen to determine or receive location information of the stylus device 102 and other information from the stylus device 102.

FIG. 11 is a block diagram conceptually illustrating example components of the stylus device 102. In operation, the stylus device 102 may include computer-readable and computer-executable instructions that reside on the stylus device 102, as discussed further below. The stylus device 102 may include an address/data bus 1102 for conveying data among components of the stylus device 102. Each component within the stylus device 102 may also be directly connected to other components in addition to (or instead of) being connected to other components across the bus 1102.

The stylus device 102 may include one or more microcontrollers/controllers/processors 804 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The stylus device 102 may also include a data storage component 808, for storing data and microcontrollers/controller/processor-executable instructions. The data storage component 808 may include one or more non-volatile storage types such as magnetic storage, optical storage, solid-state storage, etc.

Instructions for operating the stylus device 102 and its various components may be executed by the microcontroller(s)/controller(s)/processor(s) 1104, using the memory 1106 as temporary "working" storage at runtime. The instructions may be stored in a non-transitory manner in non-volatile memory 1106, storage 1108, or an external device. Alternatively, some or all of the executable instructions may be embedded in hardware or firmware in addition to or instead of software.

The stylus device 102 includes input/output device interfaces 1110. A variety of components may be connected through the input/output device interfaces 1110, such as an audio output device for producing sound, such as speaker(s) 1112; a light emitting diode (LED) 1114; a haptic generator 1116; and/or other components, such as a display; one or more audio capture device(s), such as a microphone or an array of microphones; buttons; and other components. The speaker(s) 1114, the LED 1114, the haptic generator 1116 and other components may be integrated into the stylus device 102 or may be separate.

The stylus device 102 may also include a sensor 1120 that detects when the stylus device 102 is properly aligned and coupled to the computing device, as described above. Based on this information, the stylus device 102 may turn off to save power and/or transfer data between the stylus device 102 and the computing device 104. Further, one or more of the speaker(s) 1114, the LED 1114, the haptic generator 1116, and/or other components may also be adapted to output an indicator to the user that the stylus device is properly and/or improperly aligned as determined by a sensor 1120.

The input/output device interfaces 1110 may also include an interface for an external peripheral device connection such as universal serial bus (USB), FireWire, Thunderbolt or other connection protocol. The input/output device interfaces 1110 may also include a connection to one or more wireless networks, such as a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus device 102 may connect to the computing device 104 via one of these connections. Additionally, in some embodiments, the computing device 104 and the stylus device 102 may communicate using electromagnetic and/or haptic communications (for example, electric fields generated by each device to transmit data on a carrier frequency).

In general, the stylus device 102 includes a force sensor 1118 for measuring an amount of force (for example, pressure, shear, and any other force in any direction) at the tip of the stylus device 102. The force sensor 1118 may be for example, an optical pressure sensor, a capacitive pressure sensor, a piezoelectric sensor, a piezoelectric resistive sensor, or other sensor capable of measuring pressure and/or force.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or mechanics should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

As used in this disclosure, the term "a" or "one" may include one or more items unless specifically stated otherwise. Further, the phrase "based on" is intended to mean "based at least in part on" unless specifically stated otherwise.

What is claimed is:

1. A system for coupling a stylus device to a computing device, comprising:
   a first pair of magnets disposed in an outer peripheral edge portion of the computing device, the first pair of magnets including:
      a first magnet having a magnetic south pole oriented in a first direction; and
      a second magnet having a magnetic north pole oriented in the first direction and adjacent to the first magnet, wherein the first magnet and the second magnet are disposed in the outer peripheral edge of the computing device; and
   a second pair of magnets disposed in a body of the stylus device, the second pair of magnets including:
      a third magnet having a magnetic south pole oriented in a second direction to align with the magnetic north pole of the second magnet to magnetically couple the stylus device to the computing device when a tip of the stylus device is distal to a corner of the computing device and an end of the stylus device opposite the tip is proximal to the corner of the computing device; and
      a fourth magnet adjacent to the third magnet, the fourth magnet having a magnetic north pole and oriented in the second direction to align the magnetic north pole of the fourth magnet with the magnetic south pole of the first magnet to magnetically couple the stylus device to the computing device when the tip of the stylus device is distal to the corner of the computing device and the end of the stylus device is proximal to the corner of the computing device,
   wherein the first pair of magnets and second pair of magnets resist a shear force to the stylus device when the magnetic south pole of the third magnet is aligned with the magnetic north pole of the second magnet and the magnetic north pole of the fourth magnet is aligned with the magnetic south pole of the first magnet.

2. The system of claim 1, further comprising:
   a fifth magnet disposed in the outer peripheral edge portion of the computing device proximate to the corner of the computing device; and
   a ferromagnetic clip coupled to an exterior surface of the stylus device proximal to the end of the stylus device and oriented to align with and magnetically couple to the third magnet when the magnetic south pole of the third magnet is aligned with the magnetic north pole of the second magnet and the magnetic north pole of the fourth magnet is aligned with the magnetic south pole of the first magnet.

3. A stylus device, comprising:
   a pair of magnets comprising:
      a first magnet disposed in the stylus device, the first magnet having a first magnetic pole oriented in a first direction to align with a second magnetic pole of a second magnet of a computing device, the second magnetic pole being opposite to the first magnetic pole,
      a third magnet disposed in the stylus device adjacent to the first magnet, the third magnet having a third magnetic pole oriented in the first direction to align with a fourth magnet of the computing device, the second magnet being adjacent to the fourth magnet; and
   a ferromagnetic clip coupled to the stylus device and oriented to align with and magnetically couple to a fifth magnet of the computing device when the first magnet is aligned with the second magnet,
   wherein the stylus is configured to magnetically couple to the computing device when the first magnet is aligned with the second magnet and the ferromagnetic clip is aligned with the fifth magnet.

4. The stylus device of claim 3, wherein a first magnetic force between the first magnet and the second magnet, and a second magnetic force between the ferromagnetic clip and the fifth magnet resist shear or rotational forces applied to the stylus device when the first magnet is aligned with the second magnet and the ferromagnetic clip is aligned with the fifth magnet.

5. The stylus device of claim 3, wherein a first magnetic force between the first magnet and the second magnet, and a second magnetic force between the ferromagnetic clip and the fifth magnet push or pull the stylus device to align the first magnet with the second magnet and to align the ferromagnetic clip with the fifth magnet.

6. The stylus device of claim 3, further comprising a sensor disposed in the stylus device and adapted to detect when the stylus device is magnetically coupled to the computing device.

7. The stylus device of claim 3, wherein the ferromagnetic clip comprises a stainless steel alloy that is magnetically permeable.

8. The stylus device of claim 3, wherein the first magnetic pole of the first magnet aligns with the second magnetic pole of the second magnet and the third magnetic pole of the third magnet aligns with the fourth magnetic pole of the fourth magnet when a tip of the stylus device is distal to a corner of the computing device and an end of the stylus device opposite the tip is proximal to the corner of the computing device.

9. The stylus device of claim 8, wherein the ferromagnetic clip is proximal to the end of the stylus and aligns with the fifth magnet when the tip of the stylus device is distal to the corner of the computing device and the end of the stylus device is proximal to the corner of the computing device.

10. The stylus device of claim 3, wherein a first magnetic force between the first magnet and the second magnet is larger than a second magnetic force between the ferromagnetic clip and the fifth magnet.

11. A computing device, comprising:
a first magnet disposed in the computing device, the first magnet having a first magnetic pole oriented in a first direction to align with a second magnetic pole of a stylus device, the second magnetic pole being opposite to the first magnetic pole, a first magnetic force existing between the first magnet and the second magnet; and
a third magnet disposed in the computing device proximal to a corner of the computing device and oriented to align with a ferromagnetic clip of the stylus device when the first magnet is aligned with the second magnet, the third magnet aligning with the ferromagnetic clip when a tip of the stylus device is distal to the corner of the computing device and an end of the stylus device is proximal to the corner of the computing device, a second magnetic force existing between the third magnet and the ferromagnetic clip, the first magnetic force being larger than the second magnetic force,
wherein the stylus is configured to magnetically couple to the computing device when the first magnet is aligned with the second magnet and the ferromagnetic clip is aligned with the third magnet,
wherein a first magnetic force between the first magnet and the second magnet is larger than a second magnetic force between the third magnet and the ferromagnetic clip.

12. The computing device of claim 11, wherein the first magnetic force and the second magnetic force resist shear and rotational forces applied to the stylus device when the first magnet is aligned with the second magnet and the ferromagnetic clip is aligned with the third magnet.

13. The computing device of claim 11, wherein the first magnetic force and the second magnetic force push or pull the stylus device to align the first magnet with the second magnet and to align the ferromagnetic clip with the third magnet.

14. The computing device of claim 11, further comprising a sensor disposed in the computing device and adapted to detect when the stylus device is magnetically coupled to the computing device.

15. The computing device of claim 11, wherein the computing device comprises a first pair of magnets, the first pair of magnets comprising:
the first magnet; and
a fourth magnet disposed in the computing device adjacent the first magnet and having a magnetic north pole oriented in the first direction to align with a fifth magnet of the stylus device, the fifth magnet adjacent the second magnet.

16. The computing device of claim 15, wherein the first magnetic pole aligns with the second magnetic pole and the magnetic north pole of the fourth magnet aligns with a magnetic south pole of the fifth magnet when the tip of the stylus device is distal to the corner of the computing device and the end of the stylus device opposite the tip is proximal to the corner of the computing device.

17. The computing device of claim 11, wherein the first magnet is spaced a distance from the third magnet along a peripheral portion of the computing device.

* * * * *